United States Patent
Kim

(10) Patent No.: US 12,294,449 B2
(45) Date of Patent: May 6, 2025

(54) METHOD FOR TRANSMITTING SYNCHRONIZATION SIGNAL IN WIRELESS COMMUNICATION SYSTEM, AND APPARATUS THEREFOR

(71) Applicant: LG ELECTRONICS INC., Seoul (KR)

(72) Inventor: Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 385 days.

(21) Appl. No.: 17/784,018

(22) PCT Filed: Dec. 12, 2019

(86) PCT No.: PCT/KR2019/017583
§ 371 (c)(1),
(2) Date: Jun. 9, 2022

(87) PCT Pub. No.: WO2021/117940
PCT Pub. Date: Jun. 17, 2021

(65) Prior Publication Data
US 2023/0023874 A1 Jan. 26, 2023

(51) Int. Cl.
*H04J 11/00* (2006.01)
*H04L 27/26* (2006.01)
*H04W 56/00* (2009.01)

(52) U.S. Cl.
CPC .... *H04J 11/0069* (2013.01); *H04L 27/26025* (2021.01); *H04L 27/2605* (2013.01); *H04W 56/001* (2013.01)

(58) Field of Classification Search
CPC ............ H04J 11/0069; H04L 27/26025; H04L 27/2605; H04W 56/001
See application file for complete search history.

(56) References Cited

U.S. PATENT DOCUMENTS

| | | | |
|---|---|---|---|
| 2005/0163238 A1 | 7/2005 | Fujii | |
| 2018/0123849 A1* | 5/2018 | Si | ............. H04J 11/0073 |
| 2019/0104005 A1* | 4/2019 | Kim | ........ H04L 5/0051 |
| 2019/0173600 A1 | 6/2019 | Cheng | |
| 2021/0135918 A1* | 5/2021 | Zewail | ............ H04W 56/001 |
| 2022/0104230 A1* | 3/2022 | Yoshimura | ........... H04L 5/0028 |

FOREIGN PATENT DOCUMENTS

| | | |
|---|---|---|
| KR | 10-2018-0033442 | 4/2018 |
| KR | 10-2019-0068533 | 6/2019 |
| WO | 2017-018966 | 2/2017 |

* cited by examiner

*Primary Examiner* — Derrick V Rose
(74) *Attorney, Agent, or Firm* — BRYAN CAVE LEIGHTON PAISNER LLP

(57) ABSTRACT

A method by which a base station transmits a synchronization signal (SS) in a wireless communication system, according to one embodiment of the present invention, comprises the steps of: generating an SS including a primary synchronization signal (PSS) and a secondary synchronization signal (SSS); and transmitting the synchronization signal. A portion of the synchronization signal is transmitted in a region of a time interval corresponding to the cyclic prefix (CP) of the synchronization signal, and the portion of the synchronization signal includes the PSS and/or the SSS.

12 Claims, 12 Drawing Sheets

[FIG. 1]
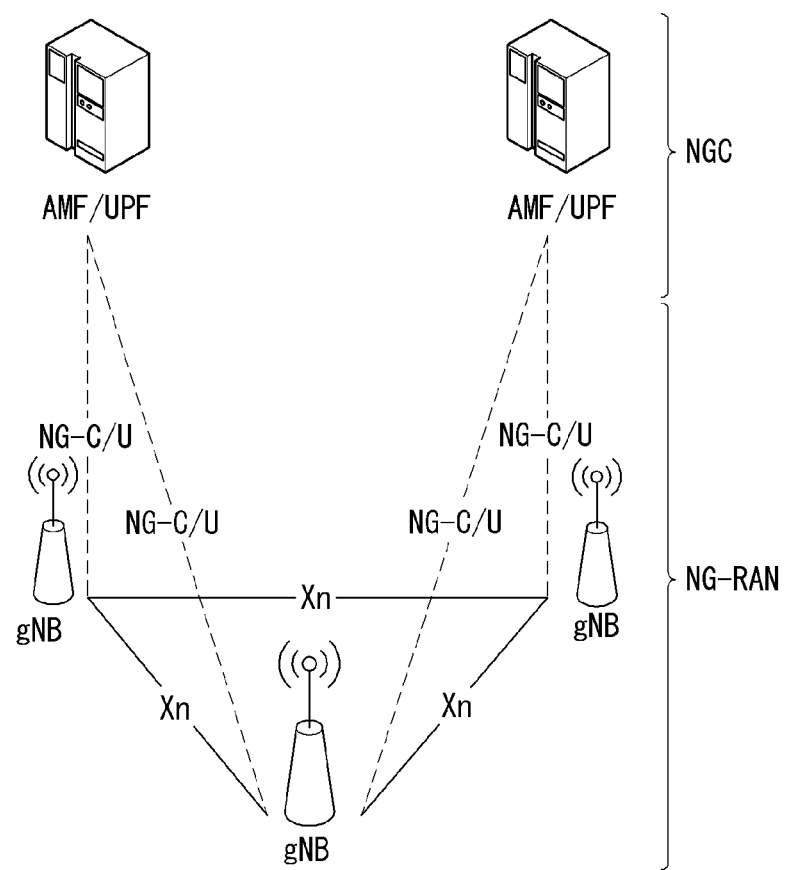

[FIG. 2]
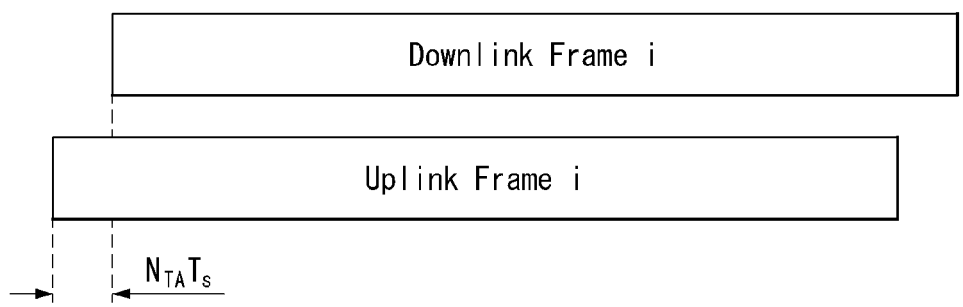

[FIG. 3]
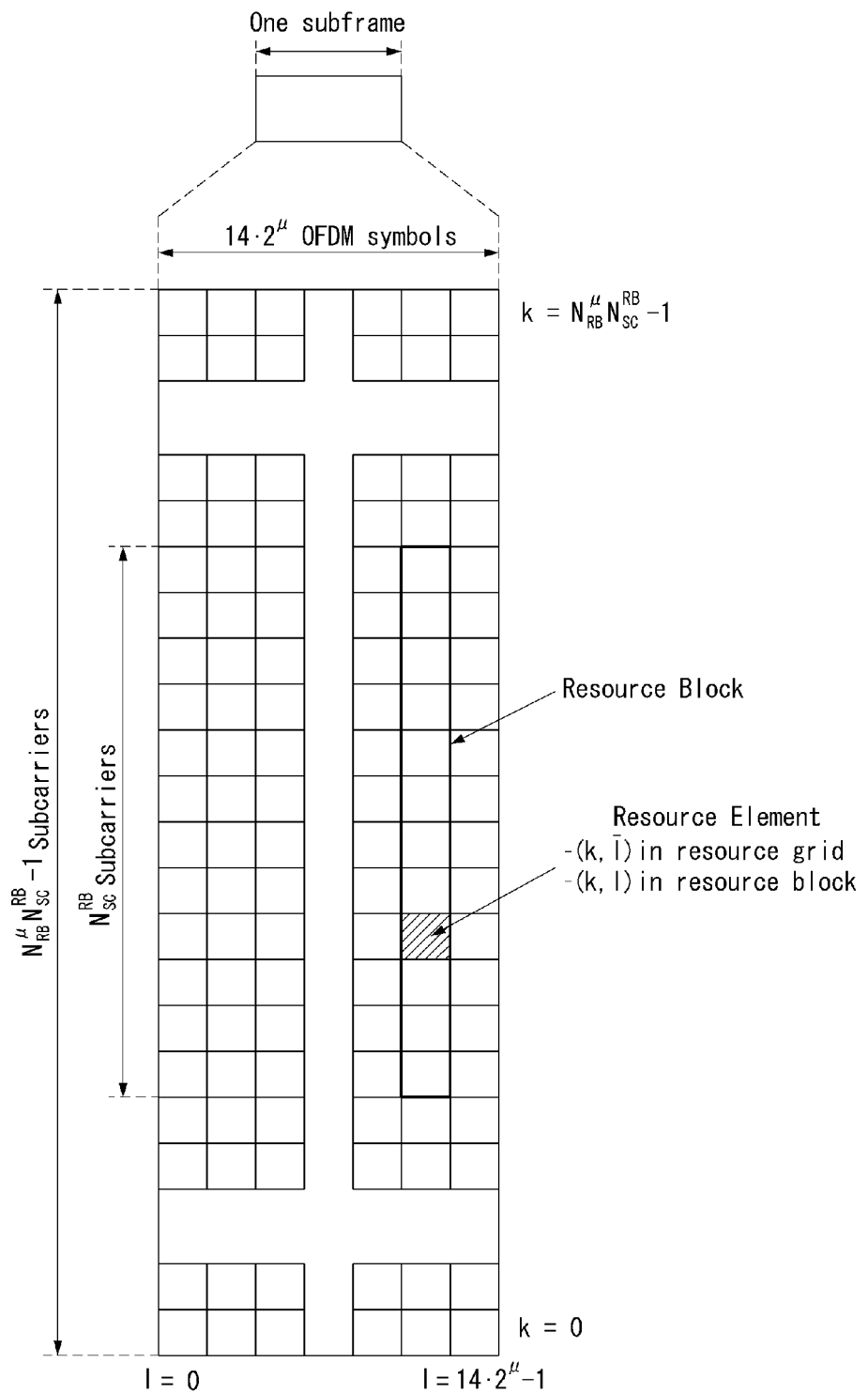

[FIG. 4]
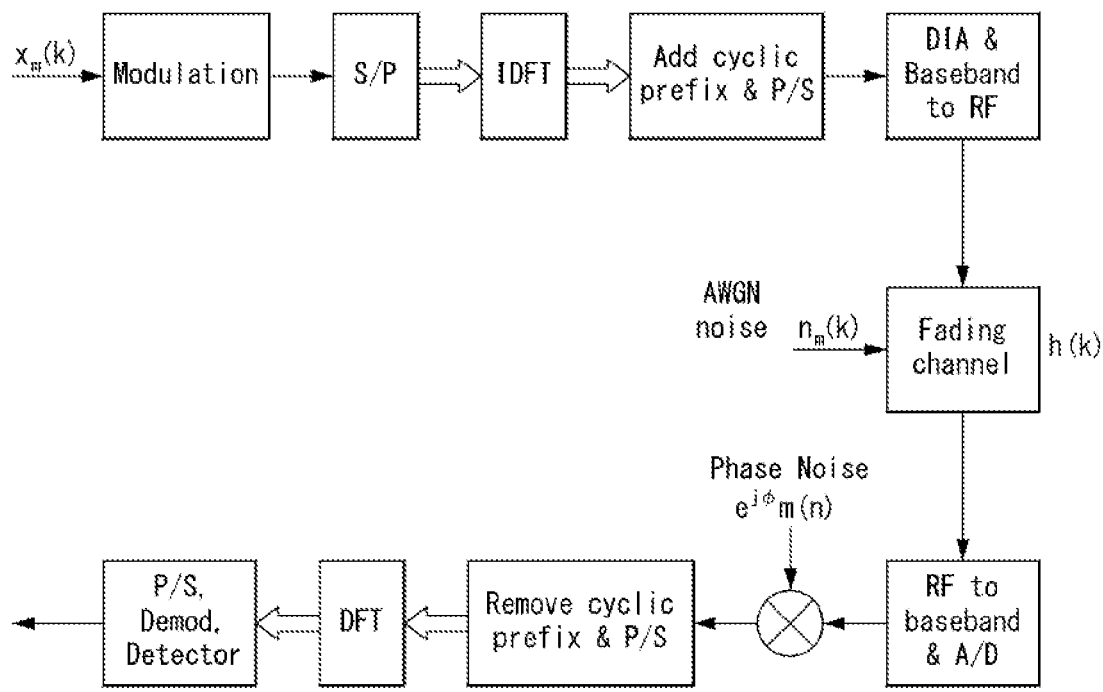

[FIG. 5]
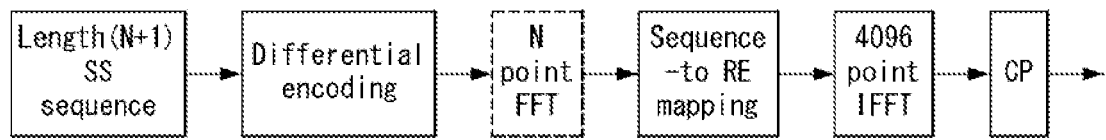

[FIG. 6]
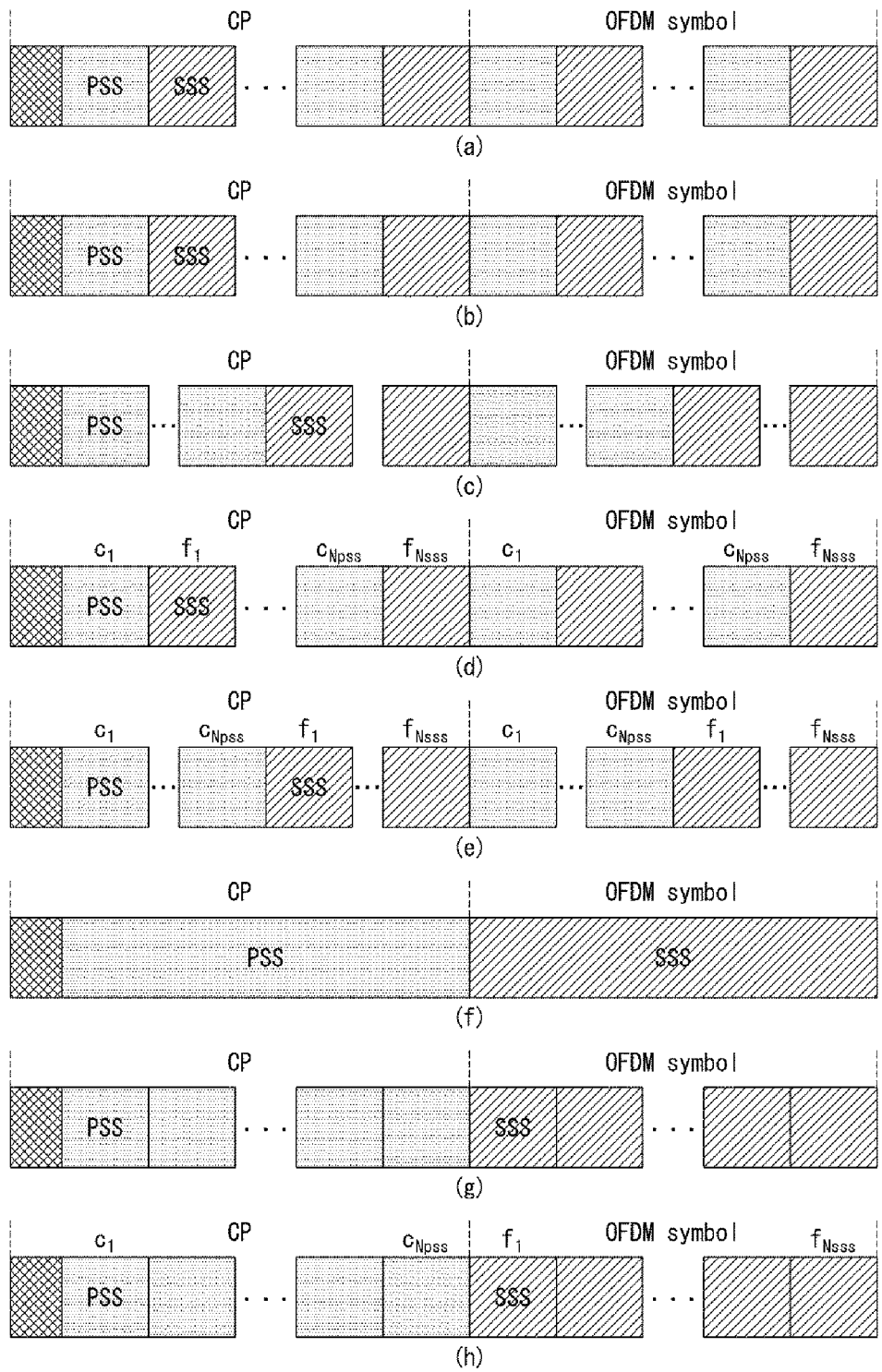

[FIG. 7]
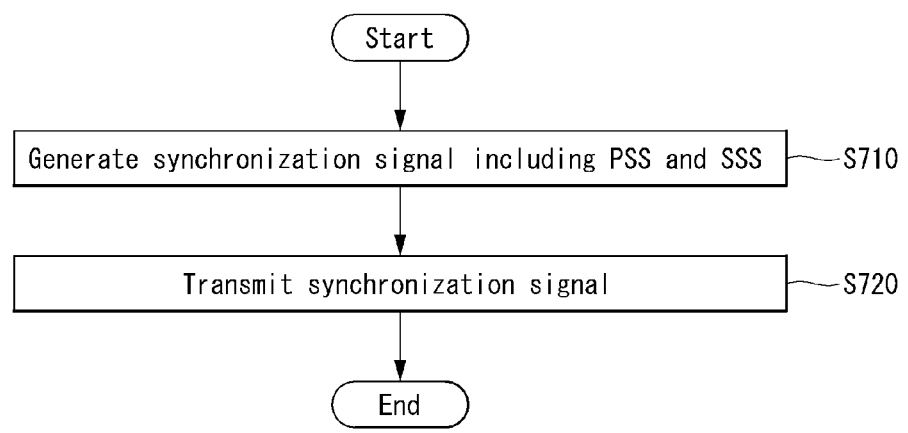

[FIG. 8]
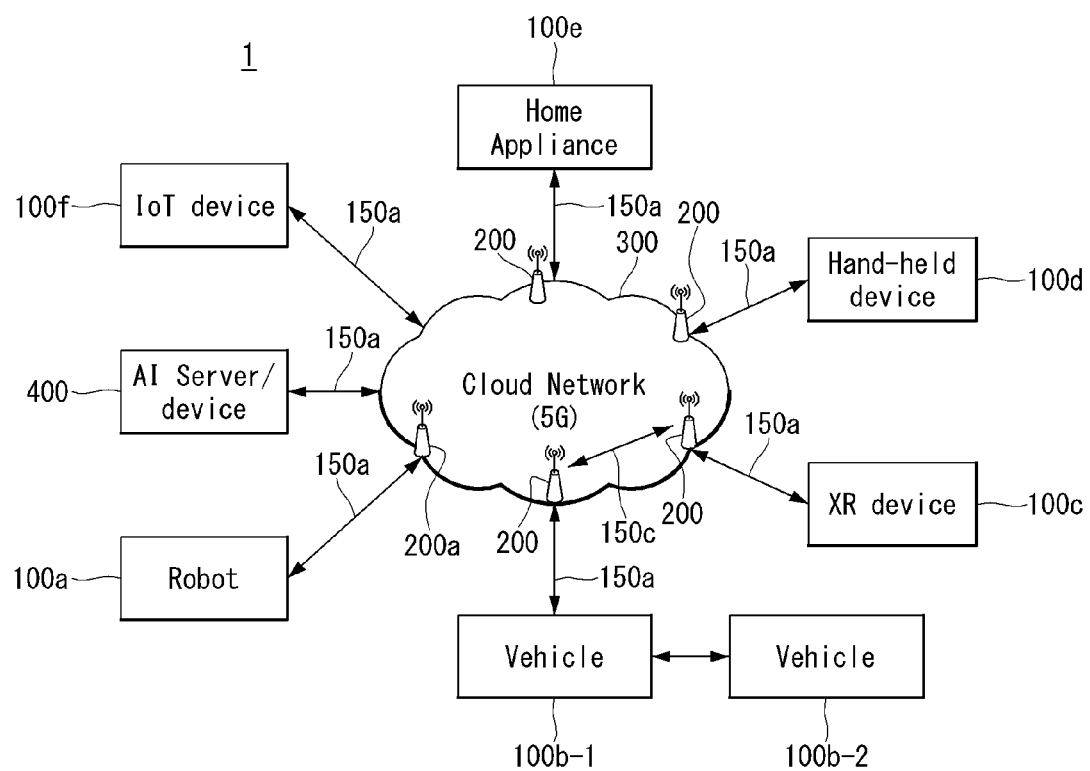

[FIG. 9]
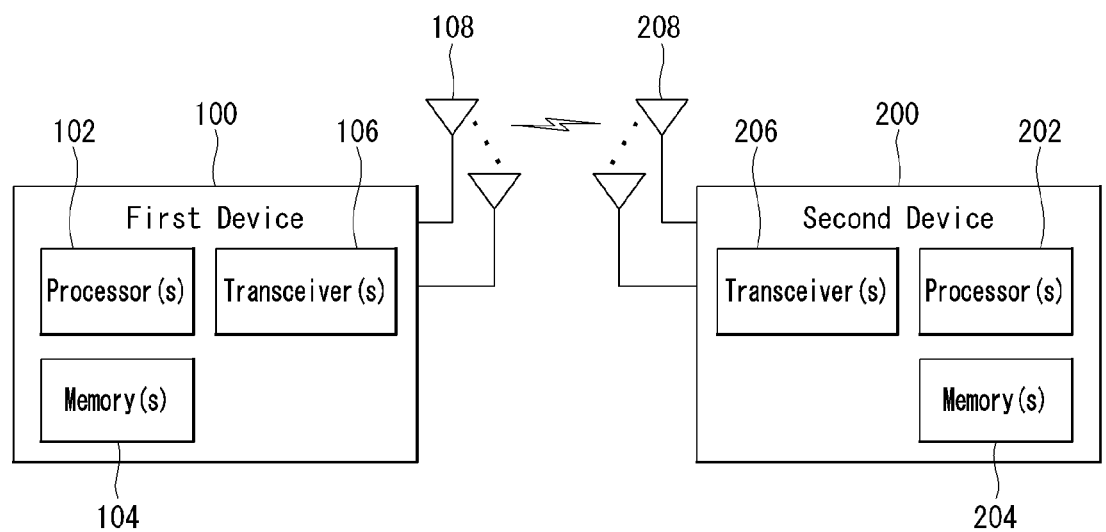

[FIG. 10]
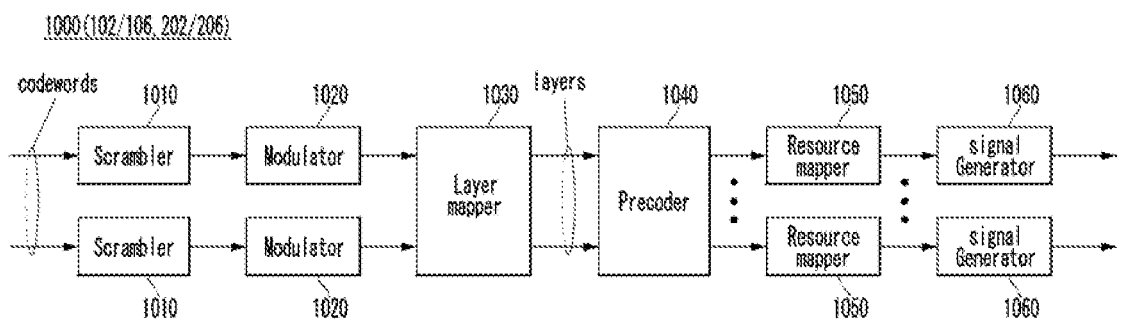

[FIG. 11]
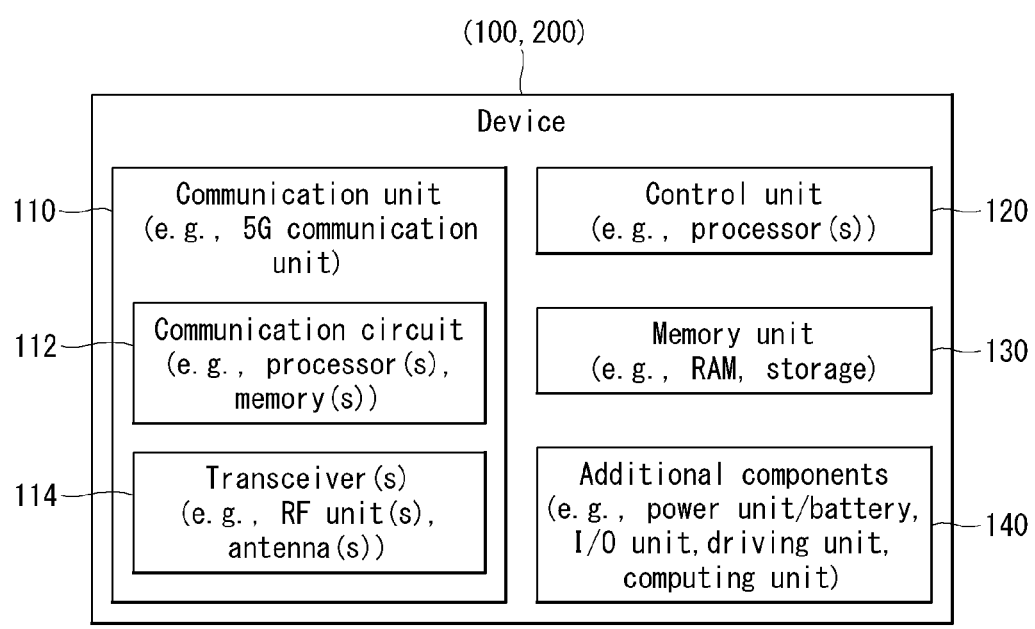

[FIG. 12]
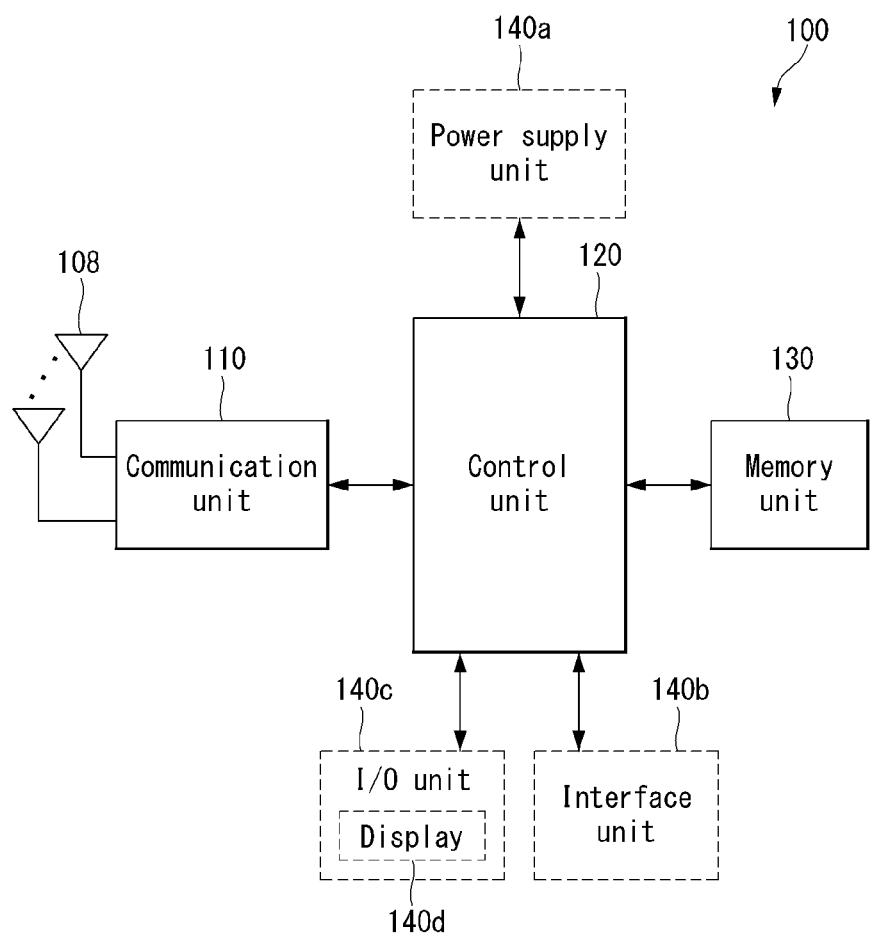

METHOD FOR TRANSMITTING SYNCHRONIZATION SIGNAL IN WIRELESS COMMUNICATION SYSTEM, AND APPARATUS THEREFOR

This application is the National Stage filing under 35 U.S.C. 371 of International Application No. PCT/KR2019/017583 filed on Dec. 12, 2019, the content of which is hereby incorporated by reference herein in its entirety.

TECHNICAL FIELD

The present disclosure relates to a method for transmitting a synchronization signal in a wireless communication system and an apparatus therefor.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like

DISCLOSURE

Technical Problem

An object of the present disclosure is to transmit a synchronization signal in consideration of the characteristics of a frequency band in which a wireless communication system operates.

Objects of the disclosure are not limited to the foregoing, and other unmentioned objects would be apparent to one of ordinary skill in the art from the following description.

Technical Solution

In an aspect, a method of transmitting a synchronization signal by a base station (BS) in a wireless communication system includes generating a synchronization signal (SS) including a primary synchronization signal (PSS) and a secondary synchronization signal (SSS) and transmitting the SS.

A portion of the SS may be transmitted in a region of a time interval corresponding to a cyclic prefix (CP) of the SS, and a portion of the SS may include at least one of the PSS and the SSS.

A length of the CP may be based on at least one of (i) a subcarrier spacing applied to signal transmission in the wireless communication system, (ii) a number of orthogonal frequency division multiplexing (OFDM) symbols included in a specific time interval according to the subcarrier spacing, or (iii) a number of OFDM symbols for the CP within the specific time interval.

The SS may be generated through differential encoding.

The CP may be a first CP having a first length or a second CP having a second length, and satisfy the equation below:

$$\frac{1}{F_s}(N_s + aCP_1 + (N_s - a)CP_2) = 0.5\text{(ms)} \qquad \text{[Equation]}$$

Here, $F_S$ is the subcarrier spacing, $CP_1$ is the first length, $CP_2$ is the second length, $N_S$ is a number of OFDM symbols included in a time interval of 0.5 ms according to the subcarrier spacing, and a is a number of OFDM symbols to which the first CP is applied, among the $N_S$ number of OFDM symbols.

The first length may be set to be greater than or equal to 1 OFDM symbol.

Thea may be 1.

The first CP and the second CP may be set such that a difference between the first length and the second length is minimized.

The subcarrier spacing may be greater than or equal to 960 KHz.

In another aspect, abase station of transmitting a synchronization signal (SS) in a wireless communication system, includes one or more transceivers, one or more processors, and one or more memories operably connected to the one or more processors and configured to store instructions of performing operations when transmission of the SS is executed by the one or more processors. The operations may include generating an SS including a primary synchronization signal (PSS) and a secondary synchronization signal (SSS) and transmitting the SS. A portion of the SS may be transmitted in a region of a time interval corresponding to a cyclic prefix (CP) of the SS, and a portion of the SS may include at least one of the PSS and the SSS.

A length of the CP may be based on at least one of (i) a subcarrier spacing applied to signal transmission in the wireless communication system, (ii) a number of orthogonal frequency division multiplexing (OFDM) symbols included in a specific time interval according to the subcarrier spacing, or (iii) a number of OFDM symbols for the CP within the specific time interval.

The SS may be generated through differential encoding.

The CP may be a first CP having a first length or a second CP having a second length and may satisfy the equation below:

$$\frac{1}{F_s}(N_s + aCP_1 + (N_s - a)CP_2) = 0.5\text{(ms)} \qquad \text{[Equation]}$$

Here, $F_S$ is the subcarrier spacing, $CP_1$ is the first length, $CP_2$ is the second length, $N_S$ is a number of OFDM symbols included in a time interval of 0.5 ms according to the subcarrier spacing, and a is a number of OFDM symbols to which the first CP is applied, among the $N_S$ number of OFDM symbols.

In another aspect, an apparatus includes one or more memories and one or more processors functionally connected to the one or more memories. The one or more processors may be configured to control the apparatus to generate a synchronization signal (SS) including a primary synchronization signal (PSS) and a secondary synchronization signal (SSS) and to transmit the SS.

A portion of the SS may be transmitted in a region of a time interval corresponding to a cyclic prefix (CP) of the SS, and a portion of the SS may include at least one of the PSS and the SSS.

A length of the CP may be based on at least one of (i) a subcarrier spacing applied to signal transmission in a wireless communication system in which the apparatus operates, (ii) a number of orthogonal frequency division multiplexing (OFDM) symbols included in a specific time interval according to the subcarrier spacing, or (iii) a number of OFDM symbols for the CP within the specific time interval.

The CP may be a first CP having a first length or a second CP having a second length, and may satisfy the equation below:

$$\frac{1}{F_s}(N_s + aCP_1 + (N_s - a)CP_2) = 0.5 \text{(ms)} \quad \text{[Equation]}$$

Here, $F_S$ is the subcarrier spacing, $CP_1$ is the first length, $CP_2$ is the second length, $N_S$ is a number of OFDM symbols included in a time interval of 0.5 ms according to the subcarrier spacing, and a is a number of OFDM symbols to which the first CP is applied, among the $N_S$ number of OFDM symbols.

Advantageous Effects

According to an embodiment of the present disclosure, a portion of a synchronization signal in a terahertz frequency band (THz frequency band) is transmitted in a time domain corresponding to a cyclic prefix of the synchronization signal. Accordingly, the reliability of synchronization signal transmission may be secured in a communication environment where the influence of phase noise is large, and it is easy to secure cell coverage because a synchronization signal repetition transmission effect may be obtained.

Also, according to an embodiment of the present disclosure, the synchronization signal is generated through differential decoding. Through this, the influence of phase noise, which increases proportionally with time, may be minimized.

Effects of the disclosure are not limited to the foregoing, and other unmentioned effects would be apparent to one of ordinary skill in the art from the following description

DESCRIPTION OF DRAWINGS

FIG. 1 illustrates an example of an overall structure of a NR system to which a method proposed by the present specification is applicable.

FIG. 2 illustrates a relation between an uplink frame and a downlink frame in a wireless communication system to which a method proposed by the present specification is applicable.

FIG. 3 illustrates an example of a resource grid supported in a wireless communication system to which a method proposed by the present specification is applicable.

FIG. 4 is a block diagram for analyzing the influence of phase noise in an OFDM system.

FIG. 5 is a diagram illustrating generating of a primary synchronization signal (PSS) according to an embodiment of the present disclosure.

FIG. 6 is a diagram illustrating transmission of a primary synchronization signal (PSS) and a secondary synchronization signal (SSS) in a time domain according to an embodiment of the present disclosure.

FIG. 7 is a diagram illustrating a method for a base station to transmit a synchronization signal in a wireless communication system according to an embodiment of the present disclosure.

FIG. 8 illustrates a communication system 1 applied to the present disclosure.

FIG. 9 illustrates a wireless device applicable to the present disclosure.

FIG. 10 illustrates a signal processing circuit applied to the present disclosure.

FIG. 11 illustrates another example of a wireless device applied to the present disclosure.

FIG. 12 illustrates a portable device applied to the present disclosure.

MODE FOR DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts may obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

Definition of Terms eLTE eNB: An eLTE eNB is an evolution of an eNB that supports connectivity to EPC and NGC.
gNB: A node which supports the NR as well as connectivity to NGC.
New RAN: A radio access network which supports either NR or E-UTRA or interfaces with the NGC.
Network slice: A network slice is a network defined by the operator customized to provide an optimized solution for a specific market scenario which demands specific requirements with end-to-end scope.
Network function: A network function is a logical node within a network infrastructure that has well-defined external interfaces and well-defined functional behavior.
NG-C: A control plane interface used on NG2 reference points between new RAN and NGC.
NG-U: A user plane interface used on NG3 reference points between new RAN and NGC.
Non-standalone NR: A deployment configuration where the gNB requires an LTE eNB as an anchor for control plane connectivity to EPC, or requires an eLTE eNB as an anchor for control plane connectivity to NGC.
Non-standalone E-UTRA: A deployment configuration where the eLTE eNB requires a gNB as an anchor for control plane connectivity to NGC.
User plane gateway: A termination point of NG-U interface.

System General

FIG. 1 illustrates an example of an overall structure of a new radio (NR) system to which a method proposed by the present specification is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$, where $\Delta f_{max}=480 \cdot 10^3$, and $N_f=4096$. Downlink and uplink transmissions are organized into radio frames with a duration of $T_f=(\Delta f_{max} N_f/100) \cdot T_s=10$ ms. The radio frame consists of ten subframes each having a section of $T_{sf}=(\Delta f_{max} N_f/1000) \cdot T_s=1$ ms. In this case, there may be a set of frames in the uplink and a set of frames in the downlink.

FIG. 2 illustrates a relation between a UL frame and a DL frame in a wireless communication system to which a method proposed by the disclosure is applicable.

As illustrated in FIG. 2, a UL frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe, and are numbered in increasing order of $n_{s,f}^\mu \in \{0, \ldots, n_{frame}^{slots,\mu}-1\}$ within a radio frame. One slot consists of consecutive OFDM symbols of $N_{symb}^{\mu}$, and $N_{symb}^{\mu}$ is determined depending on a numerology in use and slot configuration. The start of slots $n_s^{\mu}$ in a subframe is aligned in time with the start of OFDM symbols $n_s^{\mu} N_{symb}^{\mu}$ in the same subframe.

Not all UEs are able to transmit and receive at the same time, and this means that not all OFDM symbols in a DL slot or an UL slot are available to be used.

Table 2 represents the number of OFDM symbols $N_{symb}^{slot}$ per slot in a normal CP, the number of slot $N_{slot}^{frame,\mu}$ per radio frame and the number of slot $N_{slot}^{subframe,\mu}$ per subframe, and Table 3 represents the number of OFDM symbols in an extended CP, the number of slot per radio frame and the number of slot per subframe.

FIG. 3 illustrates an example of a resource grid supported in a wireless communication system to which a method proposed by the disclosure may be applied.

Referring to FIG. 3, a resource grid is composed of $N_{RB}^{\mu} N_{sc}^{RB}$ subcarriers in a frequency domain, each subframe composed of $14 \cdot 2\mu$ OFDM symbols, but the disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

TABLE 2

Slot configuration

| | | 0 | | | 1 | |
|---|---|---|---|---|---|---|
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 2220 | 32 | — | — | — |

TABLE 3

Slot configuration

| | | 0 | | | 1 | |
|---|---|---|---|---|---|---|
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 2220 | 32 | — | — | — |

NR Physical Resource

Regarding physical resources in the NR system, an antenna port, a resource grid, a resource element, a resource block, a carrier part, etc. May be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Hereinafter, matters related to the characteristics of the terahertz frequency band (THz frequency band) will be described. Of course, the methods described below are separated for convenience of description, and some components of one method may be substituted with some components of another method or may be applied in combination with each other.

In general, a terahertz communication system (THz communication system) refers to a system operating in a frequency band of 0.1 THz or higher. As the frequency increases, the wavelength of the radio wave is shorter, and thus, in the case of the system, matters that did not need to be considered in the existing radio channel should be considered. For example, since water/water vapor or fine dust on a propagation path may affect propagation characteristics, a channel model or channel measurement is required to take this into consideration.

Equations 1 and 2 below illustrate radio wave absorption models for oxygen and water vapor.

$$L_{oxygen} = \begin{cases} 0.001\left(0.0719 + \dfrac{6.09}{f^2 + 0.227} + \dfrac{4.81}{(f-57)^2 + 1.50}\right)f^2, & f < 57 \text{ GHz} \\ L_{oxygen}(57 \text{ GHz}) + 1.5(f-57), & f \geq 57 \text{ GHz} \end{cases}$$ [Equation 1]

$$L_{water} = 0.0001$$ [Equation 2]

$$\left(0.05 + 0.0021\rho + \dfrac{3.6}{(f-22.2)^2 + 8.5} + \dfrac{10.6}{(f-183.3)^2 + 9.0} + \dfrac{8.9}{(f-325.4)^2 + 26.3}\right)$$

$$f^2 \rho, \; f < 350 \text{ GHz}$$

Here, $\rho=7.5$ g/m$^3$ at the sea surface.

When the frequency increases, the influence of phase noise increases according to an oscillator device and the difficulty of implementation. Even in a terahertz communication system, when an OFDM waveform (Orthogonal Frequency Division Multiplexing waveform) is assumed as in the 5G NR standard, phase noise needs to be considered as a factor that significantly affects a system design. This will be described with reference to FIG. 4 hereinafter.

FIG. 4 is a block diagram for analyzing the influence of phase noise in an OFDM system.

Referring to FIG. 4, phase noise in the time domain is expressed by Equation 3 below.

$$\phi_m(n) = \phi_{m-1}(N-1) + \sum_{i=-N_g}^{n} u(m(N+N_g)+i)$$ [Equation 3]

Here, u(i) is a Gaussian in which a mean is 0 and a variance is $\sigma^2 = 2\pi\beta t$, t is a sampling time, N is a Fast Fourier Transform size of the OFDM system, Ng is a Cyclic Prefix (CP) length, and $\beta$ is a 3 dB bandwidth of a Lorentzian spectral density function.

A general expression of a Lorentzian function including $\beta$ is expressed by Equation (4) below.

$$S_\phi(f) = \dfrac{2\pi\beta}{f^2 + 2\pi^2\beta^2}$$ [Equation 4]

In FIG. 4, a received signal for analyzing the influence of phase noise may be expressed as in Equation 5 below.

$$y_m(k) = F(r_m(n)) = F\left(e^{j\phi_m(n)} s_m(n) \otimes h(k) + n_m(n)\right) =$$ [Equation 5]

$$x_m(k)h(k)c_m(0) + \sum_{l=0, l \neq k}^{N-1} x_m(l)h(l)c_m(l-k) + n_m(k)$$

Here, $s_m(n)$ is $$\dfrac{1}{\sqrt{N}} \sum_{k=0}^{N-1} x_m(k) e^{\frac{j2\pi nk}{N}}, \; c_m(p) \text{ is } \dfrac{1}{N} \sum_{k=0}^{N-1} e^{\frac{j2\pi np}{N}} e^{j\phi_m(n)},$$

and F is a Discrete Fourier Transform (DFT) operation.

In Equation 5, $c_m(0)$ of the first term is a common phase error (CPE) indicating the influence of phase noise commonly made on all subcarriers, and the second term, $\sum_{l=0, l \neq k}^{N-1} x_m(l)h(l)c_m(l-k)$ is inter-carrier interference (ICI) indicating the influence made on adjacent subcarriers. Calculating the SINR (Signal to Interference-plus-Noise Ratio) of the subcarrier from Equation 5 is as shown in Equation 6 below.

$$SINR = \dfrac{E\left[|c_m(0)|^2\right]}{E\left[\left|\sum_{l=0, l \neq k}^{N-1} x_m(l)h(l)c_m(l-k)\right|^2 + \sigma^2\right]} =$$ [Equation 6]

$$\dfrac{2\dfrac{d_0^{N+1} - (N+1)d_0 + N}{(d_0-1)^2} - N}{\sum_{p=1}^{N-1}\left\{2\dfrac{d_p^{N+1} - (N+1)d_p + N}{(d_p-1)^2} - N\right\} + \dfrac{N^2}{\gamma_s}}$$

In Equation 6, $d_p$ is $$e^{j\frac{2\pi p}{N} - \frac{\pi\beta}{R}},$$

R is $$\dfrac{N}{T},$$

and $\gamma_s$ is $$\dfrac{1}{\sigma^2}.$$

Referring to Equation 6, a system parameter affecting an SINR due to phase noise is $\beta$, $$R = \dfrac{N}{T}.$$

That is, device characteristics ($\beta$) according to the terahertz (THz) frequency band, an FFT size (N) of the OFDM system, and a subcarrier spacing (1/T) affect the SINR. Therefore, it is necessary to determine the subcarrier spacing of the OFDM system that minimizes an ICI of the SINR.

To this end, the SINR value is analyzed with a parameter combination according to Option 1 to Option 5 below.

Parameter setting of a reference system is as follows.

The subcarrier spacing is 240 KHz, the number of subcarriers (# of subcarriers) of the FFT size (N) is 2048, and a bandwidth is 500 MHz.

Option 1: subcarrier spacing 960 KHz, # of subcarrier 512, 500 MHz bandwidth

Option 2: subcarrier spacing 960 KHz, # of subcarrier 2048, 2 GHz bandwidth

Option 3: subcarrier spacing 960 KHz, # of subcarrier 4096, 4 GHz bandwidth

Option 4: subcarrier spacing 1920 KHz, # of subcarrier 8192, 16 GHz bandwidth

Option 5: subcarrier spacing 1920 KHz, # of subcarrier 4096, 8 GHz bandwidth

Table 4 below analyzes the SINR effect due to phase noise, assuming that $\gamma_s=20$ dB.

TABLE 4

| | $\frac{\beta}{R}$ | $\beta$ | Subcarrier spacing | FFT size | SINR (dB) |
|---|---|---|---|---|---|
| Reference | $10^{-5}$ | 4911 | 240 KHz | 2048 | 14.97 |
| Option 1 | $10^{-5}$ | 4911 | 960 KHz | 512 | 18.12 |
| Option 2 | $0.25 * 10^{-5}$ | 4911 | 960 KHz | 2048 | 18.12 |
| Option 3 | $0.125 * 10^{-5}$ | 4911 | 960 KHz | 4096 | 18.12 |
| Option 4 | $0.125 * 10^{-5}$ | 4911 | 1920 KHz | 8192 | 16.81 |
| Option 5 | $0.0625 * 10^{-5}$ | 4911 | 1920 KHz | 4096 | 18.96 |
| Reference | $10^{-6}$ | 491.1 | 240 KHz | 2048 | 19.14 |
| Option 1 | $10^{-6}$ | 491.1 | 960 KHz | 512 | 19.77 |
| Option 2 | $0.25 * 10^{-6}$ | 491.1 | 960 KHz | 2048 | 19.77 |
| Option 3 | $0.125 * 10^{-6}$ | 491.1 | 960 KHz | 4096 | 19.77 |
| Option 4 | $0.125 * 10^{-6}$ | 491.1 | 1920 KHz | 8192 | 19.55 |
| Option 5 | $0.0625 * 10^{-6}$ | 491.1 | 1920 KHz | 4096 | 19.88 |
| Reference | $10^{-7}$ | 49.11 | 240 KHz | 2048 | 19.90 |
| Option 1 | $10^{-7}$ | 49.11 | 960 KHz | 512 | 19.97 |
| Option 2 | $0.25 * 10^{-7}$ | 49.11 | 960 KHz | 2048 | 19.97 |
| Option 3 | $0.125 * 10^{-7}$ | 49.11 | 960 KHz | 4096 | 19.97 |
| Option 4 | $0.125 * 10^{-7}$ | 49.11 | 1920 KHz | 8192 | 19.95 |
| Option 5 | $0.0625 * 10^{-7}$ | 49.11 | 1920 KHz | 4096 | 19.98 |

Referring to Table 4, as the subcarrier spacing increases with respect to a specific value $\beta$, the degradation of SINR due to phase noise decreases. In addition, as the FFT size increases for a specific $\beta$ value and subcarrier spacing, SINR degradation due to phase noise increases. According to the analysis result of Table 4, when the subcarrier spacing is set to 960 KHz or higher or 1920 KHz or lower, the influence of phase noise may not be significant.

Hereinafter, matters related to a cyclic prefix length will be described.

In the case of the OFDM system, the CP is added to each OFDM symbol in order to eliminate the influence of inter-symbol interference (ISI). In a general CP, a rear portion of an OFDM symbol is copied and added to a first portion of the symbol. In the NR standard, two CP lengths that are not the same are defined, and a frame structure is defined so that a longer CP, among two CP lengths, is generated once every 0.5 ms (3GPP TS 38.211).

Hereinafter, in the description of the CP length according to an embodiment of the present disclosure, it is assumed that the subcarrier spacing is 960 KHz and 1920 KHz, and the FFT size is 4096. It is also assumed that 448 OFDM symbols exist in a time interval of 0.5 ms when the subcarrier spacing is 960 KHz, and 896 OFDM symbols exist in the same time interval when the subcarrier spacing is 1920 KHz. However, the assumption as described above is only for convenience of description and may be changed to another value according to an implementation method.

In the present disclosure, the cyclic prefix may be a first cyclic prefix having a first length or a second cyclic prefix having a second length.

The first cyclic prefix and the second cyclic prefix are for distinguishing cyclic prefixes having different CP lengths. For convenience, it is assumed that the first cyclic prefix is longer, but the description is not limited to that the first cyclic prefix has a long CP length and the second cyclic prefix has a short CP length.

According to an embodiment, a method of designing the CP length in the following manner may be considered.

When a frame is designed by applying the principle of generating a longer CP once every 0.5 ms, among two CP lengths, as in the NR standard, the CP length may be set to satisfy Equation 7 below.

$$\frac{1}{F_s}(N_s + CP_1 + (N_s - 1)CP_2) = \quad \text{[Equation 7]}$$
$$0.5 \text{ (ms)} \Longrightarrow \frac{0.5 F_s - N_s}{F_s} = \frac{1}{F_s N}(CP_1 + (N_s - 1)CP_2)$$

In Equation 7, $F_S$ is the subcarrier spacing, $CP_1$ is the length of the first cyclic prefix, $CP_2$ is the length of the second cyclic prefix, and $N_S$ is the number of OFDM symbols in a time interval of 0.5 ms.

Table 5 below illustrates a CP length satisfying Equation 7 above.

TABLE 5

| Subcarrier spacing | $CP_1$ length (sample) | $CP_2$ length (sample) |
|---|---|---|
| 960 KHz | 2336 | 288 |
| 1920 KHz | 4384 | 288 |

In Table 5, the length of the second cyclic prefix is fixed to 288 samples, and accordingly the length of the first cyclic prefix is summarized. Unlike Table 5, the second cyclic prefix may be set to have a longer length than the first cyclic prefix.

According to an embodiment, a method of designing the CP length in the following manner may be considered.

Specifically, the CP length may be set such that a difference between the length of the first cyclic prefix and the length of the second cyclic prefix is minimized.

As can be seen in the example of Table 5, as the subcarrier spacing increases, the length of the first cyclic prefix CP1 increases significantly compared to the length of the second cyclic prefix CP2. When the subcarrier spacing is 1920 KHz, the length of CP1 is 4384 samples, which is longer than a length of one OFDM symbol (4096 samples). In consideration of this, the CP length may be set such that the difference in length between two CPs that are not identical is minimized In this case, the CP length may be set to satisfy Equation 8 below.

$$\frac{1}{F_s}(N_s + aCP_1 + (N_s - a)CP_2) = \quad \text{[Equation 8]}$$
$$0.5 \text{ (ms)} \Longrightarrow \frac{0.5 F_s - N_s}{F_s} = \frac{1}{F_s N}(aCP_1 + (N_s - a)CP_2)$$

In Equation 8, a is the number of OFDM symbols to which the first cyclic prefix CP1 is applied. Table 6 below illustrates the CP length satisfying Equation 8.

TABLE 6

| Subcarrier spacing | $CP_1$ length (sample) | a | $CP_2$ length (sample) | $N_s - a$ |
|---|---|---|---|---|
| 960 KHz | 304 | 128 | 288 | 320 |
| | 296 | 256 | 288 | 192 |
| 1920 KHz | 304 | 256 | 288 | 640 |
| | 296 | 512 | 288 | 384 |

Hereinafter, matters related to the design of a synchronization signal (SS) will be described.

In order to secure synchronization of a UE in the OFDM system, a base station transmits a primary synchronization signal (PSS) and a secondary synchronization signal (SSS).

Through the SS, the UE acquires time/frequency synchronization and a physical cell ID. When the UE acquires coarse time synchronization through the PSS, an operation is performed in the time domain In this case, since the phase noise cannot be compensated, it is desirable to design an SS robust to phase noise.

This is because, as in Equation 3, a variance of phase noise increases with time. That is, phase noise of a current sample may be expressed by adding Gaussian noise having a variance proportional to time to phase noise of a previous sample.

Accordingly, when differential encoding is performed on the SS from Equation 3, the variance does not change with time. Phase noise of an (n+1)th sample may be expressed as in Equation 9 below with respect to phase noise of an nth sample, and here, the variance of u(1) is $\sigma^2=2\pi\beta T_s$, and $T_s$ is a sampling time.

$$\phi_m(n+1)=\phi_m(n)+u(1) \quad \text{[Equation 9]}$$

A signal subjected to differential encoding may be expressed as in Equation 10 below.

$$s(n+1)=d(n+1)s(n) \quad \text{[Equation 10]}$$

The UE assumes that phase noise is applied as in Equation 5 (e.g., $x(n+1)=e^{j\phi_m(n+1)}s(n+1)$), and when differential decoding is performed as shown in Equation 11, an original signal d(n+1) may be obtained.

$$x(n+1)x^*(n) = e^{j\phi_m(n+1)}d(n+1)s(n)e^{-j\phi_m(n)}s^*(n) = \quad \text{[Equation 11]}$$
$$e^{j(\phi_m(n+1)-\phi_m(n))}d(n+1) = e^{ju(1)}d(n+1)$$

As can be seen in Equation 11, the variance of phase noise of the signal after differential decoding is not affected by time and is maintained constant.

According to an embodiment, a method of using a cyclic prefix as an SS may be considered. According to the embodiment related to the CP length of the cyclic prefix described above, when the corresponding CP length is greater than 1 OFDM symbol, the corresponding cyclic prefix may be used as an SS. For example, in Table 5, when the subcarrier spacing is 1920 KHz, the CP length of the first cyclic prefix is greater than the length of 1 OFDM symbol.

That is, an OFDM symbol to which a cyclic prefix having a length greater than one OFDM symbol is applied may be used for SS transmission. In this case, due to the cyclic prefix (CP), the SS is in the form of repetition.

In consideration of the characteristics that a channel is attenuated in a terahertz frequency band and significantly affected by oxygen/water particles in the air, a method of securing coverage as in the following may be considered.

Coverage may be secured by applying beamforming to a plurality of antennas. Preferably, this is equally applied to the transmission of the SS. That is, the SS may be transmitted by performing beamforming in a specific direction.

Referring to Table 5 as an example, a cyclic prefix having a length longer than 1 OFDM occurs once every 0.5 ms. Therefore, since 10 beam directions may be generated in 5 ms, the 10 beam directions should be configured to include the entire cell coverage. According to 3GPP TS 38.213, a maximum of 64 beam directions are defined. Accordingly, in a terahertz communication system (THz communication system), it is preferable that a beamwidth of a beam for transmission of an SS is larger than a beamwidth supported by the NR standard. In addition, it is preferable to allocate more time/frequency resources for SS transmission in order to expand coverage.

To this end, time/frequency resource may be secured by utilizing at least one of repetition, power boosting, or use of a longer PSS/SSS sequence.

In addition, since PSS detection is mainly performed in the time domain, PSS generating may be performed as shown in FIG. 5.

FIG. 5 is a diagram illustrating generating of a primary SS (PSS) according to an embodiment of the present disclosure.

In FIG. 5, N, which is a size of the FFT, may be 4096 or a value smaller than 4096. When N is a value smaller than 4096, it means that the PSS is transmitted repeatedly. The PSS generating method according to FIG. 5 may also be applied to SSS generating.

However, all processes according to FIG. 5 are not necessarily assumed for generating the SS. For example, since the SS is a time domain signal, it may be generated without an Inverse Fast Fourier Transform (IFFT) related operation.

When the SS generating method described above is applied, PSS/SSS transmission is exemplified as shown in FIG. 6.

FIG. 6 is a diagram illustrating transmission of a primary SS (PSS) and a secondary SS (SSS) in a time domain according to an embodiment of the present disclosure.

AN SS may be transmitted in a time interval corresponding to the CP length.

Specifically, (a) of FIG. 6 to (h) of FIG. 6 illustrate a cyclic prefix (CP) according to the configuration of a PSS and an SSS included in one OFDM symbol. A portion of the SS may be transmitted in a region of the time interval corresponding to the cyclic prefix.

A portion of the SS may include at least one of the PSS and the SSS.

For example, in the cyclic prefix, at least one of PSS and SSS may be included only in a time interval corresponding to one OFDM symbol. Referring to (a) of FIG. 6 to (h) of FIG. 6, in the cyclic prefix, at least one of PSS and SSS is included in the time interval corresponding to one OFDM symbol according to the configuration of an SS.

In the cyclic prefix, a portion of PSS or SSS may be included in the remaining time interval except for the time interval corresponding to the 1 OFDM symbol. As another example, 0 or a specific sequence may be included in the remaining time interval.

The remaining time interval may be located at the frontmost region of the time interval corresponding to the cyclic prefix. 6 illustrates that the remaining time interval is located in the frontmost region of the time interval corresponding to the cyclic prefix, but this is an example. Accordingly, the remaining time interval may be located in the rearmost region of the time interval corresponding to the cyclic prefix or may be located in another region.

In (d) of FIG. 6, (e) of FIG. 6, and (h) of FIG. 6, $[c_1, \ldots, c_{Npss}]$, $[f_1, \ldots, f_{Npss}]$ is a cover sequence multiplied by PSS or SSS repeatedly transmitted by Npss and Nsss. That is, a first PSS of the PSS repeatedly transmitted by Npss is multiplied by c1 and transmitted. This means that when the PSS sequence is $[p_1, \ldots, p_N]$, the sequence is generated in the form of $[c_1 p_1, \ldots, c_1 p_N]$.

According to an embodiment, the cover sequence may be a specific binary sequence designed to improve detection performance by improving correlation characteristics of PSS and SSS.

The cover sequence may be applied to all PSSs and SSSs, or may be applied only to at least one of PSSs and/or SSSs.

One or more zeros may be inserted in the time interval between PSS and SSS. This is to reduce the influence of Inter-Symbol Interference (ISI) in consideration of the UE performing time domain detection. This may be implemented in such a manner that the sequence length of FIG. 5 is set to include 0, or that one or more 0 s exist during resource element mapping (RE mapping).

In terms of implementation, operations (e.g., SS generating and transmission/reception operations) of the base station/UE according to the embodiments described above may be processed by the apparatuses of FIGS. 8 to 12 (e.g., the processors 102 and 202 of FIG. 9) to be described later.

In addition, operations (e.g., generating and transmission/reception of an SS) of the base station/UE according to the embodiment described above may be stored in the form of commands/programs (e.g., instruction, executable code) for driving at least one processor (e.g., 102, 202 of FIG. 9) in the memory (e.g., 104 and 204 in FIG. 9).

Hereinafter, FIG. 7 is a detailed description of the embodiments described above in terms of a method for a base station to transmit an SS. The embodiments described below are only classified for convenience of description, and some components of one embodiment may be substituted with some components of another embodiment, or may be applied in combination with each other.

FIG. 7 is a diagram illustrating a method for a base station to transmit an SS in a wireless communication system according to an embodiment of the present disclosure.

Referring to FIG. 7, a method for a base station to transmit an SS in a wireless communication system according to an embodiment of the present disclosure includes generating an SS including PSS and SSS (S710) and transmitting the SS (S720).

In S710, the base station generates SSs (SS, SS) including a PSS and an SSS.

According to an embodiment, the SS may include a cyclic prefix (CP) having a specific length.

According to an embodiment, the length of the cyclic prefix may be based on (i) a subcarrier spacing applied to signal transmission in the wireless communication system, (ii) the number of OFDM (Orthogonal Frequency Division Multiplexing) symbols included in a specific time interval according to the subcarrier spacing, or (iii) the number of OFDM symbols for the cyclic prefix in the specific time interval.

According to an embodiment, the wireless communication system may support a terahertz (THz) communication system.

Specifically, the SS may be transmitted in a specific frequency band, and a lower limit of the specific frequency band may be greater than or equal to 100 GHz. As another example, the specific frequency band may be 53 to 100 GHz.

According to an embodiment, the SS may be generated through differential encoding. This is to minimize the effect that phase noise increases in proportion to time in a terahertz communication environment.

According to an embodiment, the cyclic prefix may be a first cyclic prefix having a first length or a second cyclic prefix having a second length. The cyclic prefix satisfies an equation below, $$\frac{1}{F_s}(N_s + aCP_1 + (N_s - a)CP_2) = 0.5 \text{ (ms)} \quad \text{[Equation]}$$

Here, $F_S$ is the subcarrier spacing, $CP_1$ is the first length, $CP_2$ is the second length, $N_S$ is a number of OFDM symbols included in a time interval of 0.5 ms according to the subcarrier spacing, and a is a number of OFDM symbols to which the first CP is applied, among the $N_S$ number of OFDM symbols.

According to an embodiment, the first length $CP_1$ may be set to be greater than or equal to one OFDM symbol. However, the present disclosure is not limited thereto, and the second length $CP_2$ may be set to be greater than or equal to one OFDM symbol.

According to an embodiment, the first cyclic prefix may be set to be generated only once within a time interval of 0.5 ms. In this case, in the above equation, a may be 1. However, the present disclosure is not limited thereto, and the second cyclic prefix may be set to be generated only once within a time interval of 0.5 ms.

According to an embodiment, the first cyclic prefix and the second cyclic prefix may be set such that a difference between the first length $CP_1$ and the second length $CP_2$ is minimized.

According to an embodiment, considering the influence of phase noise occurring in a terahertz communication environment, it is necessary to set a subcarrier spacing to minimize the influence. Therefore, the subcarrier spacing may be set to 960 KHz or 1920 KHz. However, the present disclosure is not limited thereto, and the subcarrier spacing $F_S$ may be greater than or equal to 960 KHz.

According to S710 described above, an operation of the base station (100/200 of FIGS. 8 to 12) generating an SS including a PSS and an SSS may be implemented by the apparatus of FIGS. 8 to 12. For example, referring to FIG. 9, the one or more processors 202 may control one or more transceivers 206 and/or one or more memories 204 to generate an SS including a PSS and an SSS.

In S720, the base station transmits the SS.

A portion of the SS may be transmitted in a region of a time interval corresponding to a CP of the SS. A portion of the SS may include at least one of the PSS and the SSS.

According to an embodiment, a region of the time interval may be a region corresponding to one OFDM symbol among the time interval corresponding to the cyclic prefix.

One region of the time interval may be located at the rearmost part of the time interval or may be located at the frontmost part of the time interval. However, the present disclosure is not limited thereto, and the location of one region of the time interval may vary according to an implementation method.

According to S720 described above, the operation of the base station (100/200 in FIGS. 8 to 12) transmitting the SS may be implemented by the apparatus of FIGS. 8 to 12. For example, referring to FIG. 9, one or more processors 202 may control one or more transceivers 206 and/or one or more memories 204 to transmit the SS.

Example of Wireless Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 8 illustrates a communication system 1 applied to the present disclosure.

Referring to FIG. 8, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 9 illustrates wireless devices applicable to the present disclosure.

Referring to FIG. 9, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 8.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 10 illustrates a signal process circuit for a transmission signal.

Referring to FIG. 10, a signal processing circuit 1000 may include scramblers 1010, modulators 1020, a layer mapper 1030, a precoder 1040, resource mappers 1050, and signal generators 1060. An operation/function of FIG. 10 may be performed, without being limited to, the processors 102 and 202 and/or the transceivers 106 and 206 of FIG. 9. Hardware elements of FIG. 10 may be implemented by the processors 102 and 202 and/or the transceivers 106 and 206 of FIG. 9. For example, blocks 1010 to 1060 may be implemented by the processors 102 and 202 of FIG. 9. Alternatively, the blocks 1010 to 1050 may be implemented by the processors 102 and 202 of FIG. 9 and the block 1060 may be implemented by the transceivers 106 and 206 of FIG. 9.

Codewords may be converted into radio signals via the signal processing circuit 1000 of FIG. 10. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 10. For example, the wireless devices (e.g., 100 and 200 of FIG. 9) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a post-coding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 11 illustrates another example of a wireless device applied to the present disclosure.

The wireless device may be implemented in various forms according to a use-case/service (refer to FIG. 8). Referring to FIG. 11, wireless devices 100 and 200 may correspond to the wireless devices 100 and 200 of FIG. 9 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 9. For example, the transceiver(s) 114 may include the one or more transceivers 106 and 206 and/or the one or more antennas 108 and 208 of FIG. 9. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 8), the vehicles (100b-1 and 100b-2 of FIG. 8), the XR device (100c of FIG. 8), the hand-held device (100d of FIG. 8), the home appliance (100e of FIG. 8), the IoT device (100f of FIG. 8), a digital broadcast terminal, a hologram device, a public safety device, an MTC device, a medicine device, a fintech device (or a finance device), a security device, a climate/environment device, the AI server/device (400 of FIG. 8), the BSs (200 of FIG. 8), a network node, etc. The wireless device may be used in a mobile or fixed place according to a use-example/service.

In FIG. 11, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM), a flash memory, a volatile memory, a non-volatile memory, and/or a combination thereof.

Example of Hand-Held Device Applied to the Present Disclosure

FIG. 12 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 12, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 11, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

The effect of the method of transmitting an SS and the device thereof according to an embodiment of the present disclosure is described as follows.

According to an embodiment of the present disclosure, a portion of an SS in a terahertz (THz) band is transmitted in a time domain corresponding to a cyclic prefix of the SS. Accordingly, the reliability of SS transmission may be secured in a communication environment where the influence of phase noise is large, and it is easy to secure cell coverage because the SS repetition transmission effect may be obtained.

Also, according to an embodiment of the present disclosure, the SS is generated through differential decoding. Through this, the influence of phase noise, which increases proportionally with time, may be minimized.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method comprising:
    generating, by a base station (BS), a sequence which is related to a synchronization signal (SS) including a primary synchronization signal (PSS) and a secondary synchronization signal (SSS);
    mapping, by the BS, the sequence to a physical resource which is based on a Resource Element (RE); and
    transmitting, by the BS to a user equipment (UE), the SS, based on the mapping,
    wherein an acquisition of a time and frequency synchronization by the UE is performed based on the SS,
    wherein a physical cell ID is determined based on the SS,
    wherein the SS is transmitted in one or more symbols,
    wherein the one or more symbols are based on consecutive Orthogonal Frequency Division Multiplexing (OFDM) symbols, wherein a portion of the SS is transmitted in a time resource region based on a cyclic prefix (CP) of the SS, and the portion of the SS includes at least one of the PSS and the SSS, wherein a length of the CP is determined based on all of (i) a subcarrier spacing applied to signal transmission in a wireless communication system, (ii) a total number of orthogonal frequency division multiplexing (OFDM) symbols within a time interval based on the subcarrier spacing, and (iii) a number of OFDM symbols for the CP within the time interval, wherein the CP is either a first CP with a first length or a second CP with a second length, a sum of a first coefficient applied to the first length and a second coefficient applied to the second length is constant and matches the total number of OFDM symbols within the time interval, and the second length is determined based on an adjustment of the first coefficient representing a number of OFDM symbols to which the first CP is applied.

2. The method of claim 1, wherein the sequence is generated through differential encoding.

3. The method of claim 1, wherein the CP satisfies equation below, $$\frac{1}{F_s}(N_s + aCP_1 + (N_s - a)CP_2) = 0.5 \text{ (ms)} \quad [\text{Equation}]$$

wherein $F_S$ is the subcarrier spacing, $CP_1$ is the first length, $CP_2$ is the second length, $N_S$ is the total number of OFDM symbols within the time interval of 0.5 ms based on the subcarrier spacing, and a is a number of OFDM symbols to which the first CP is applied, among the $N_S$ number of OFDM symbols.

4. The method of claim 3, wherein the first length is set to be greater than or equal to 1 OFDM symbol.

5. The method of claim 4, wherein the a is 1.

6. The method of claim 3, wherein the first CP and the second CP are set such that a difference between the first length and the second length is minimized.

7. The method of claim 1, wherein the subcarrier spacing is greater than or equal to 960 KHz.

8. A base station comprising:
one or more transceivers;
one or more processors; and
one or more memories operably connected to the one or more processors and configured to store instructions that, based on being executed by the one or more processors, configure the one or more processors to perform operations comprising:
generating a sequence which is related to a synchronization signal (SS) including a primary synchronization signal (PSS) and a secondary synchronization signal (SSS);
mapping the sequence to a physical resource which is based on a Resource Element (RE); and
transmitting, to a user equipment (UE), the SS, based on the mapping,
wherein an acquisition of a time and frequency synchronization by the UE is performed based on the SS,
wherein a physical cell ID is determined based on the SS,
wherein the SS is transmitted in one or more symbols,
wherein the one or more symbols are based on consecutive Orthogonal Frequency Division Multiplexing (OFDM) symbols,
wherein a portion of the SS is transmitted in a time resource region based on a cyclic prefix (CP) of the SS, and the portion of the SS includes at least one of the PSS and the SSS,
wherein a length of the CP is determined based on all of (i) a subcarrier spacing applied to signal transmission in a wireless communication system, (ii) a total number of orthogonal frequency division multiplexing (OFDM) symbols within a time interval based on the subcarrier spacing, and (iii) a number of OFDM symbols for the CP within the time interval,
wherein the CP is either a first CP with a first length or a second CP with a second length, a sum of a first coefficient applied to the first length and a second coefficient applied to the second length is constant and matches the total number of OFDM symbols within the time interval, and the second length is determined based on an adjustment of the first coefficient representing a number of OFDM symbols to which the first CP is applied.

9. The base station of claim 8, wherein the sequence is generated through differential encoding.

10. The base station of claim 8, wherein the CP satisfies equation below, $$\frac{1}{F_s}(N_s + aCP_1 + (N_s - a)CP_2) = 0.5 \text{ (ms)} \quad [\text{Equation}]$$

wherein $F_S$ is the subcarrier spacing, $CP_1$ is the first length, $CP_2$ is the second length, $N_S$ is the total number of OFDM symbols within the time interval of 0.5 ms based on the subcarrier spacing, and a is a number of OFDM symbols to which the first CP is applied, among the $N_S$ number of OFDM symbols.

11. An apparatus comprising one or more memories and one or more processors functionally connected to the one or more memories,
wherein the one or more memories store instructions that, based on being executed by the one or more processors, configure the one or more processors to perform operations comprising:
generating a sequence which is related to a synchronization signal (SS) including a primary synchronization signal (PSS) and a secondary synchronization signal (SSS);
mapping the sequence to a physical resource which is based on a Resource Element (RE); and
transmitting, to a user equipment (UE), the SS, based on the mapping,
wherein an acquisition of a time and frequency synchronization by the UE is performed based on the SS,
wherein a physical cell ID is determined based on the SS,
wherein the SS is transmitted in one or more symbols,
wherein the one or more symbols are based on consecutive Orthogonal Frequency Division Multiplexing (OFDM) symbols,
wherein a portion of the SS is transmitted in a time resource region based on a cyclic prefix (CP) of the SS, and the portion of the SS includes at least one of the PSS and the SSS,
wherein a length of the CP is determined based on all of (i) a subcarrier spacing applied to signal transmission in a wireless communication system, (ii) a total number of orthogonal frequency division multiplexing (OFDM) symbols within a time interval based on the subcarrier spacing, and (iii) a number of OFDM symbols for the CP within the time interval, wherein the CP is either a first CP with a first length or a second CP with a second length, a sum of a first coefficient applied to the first length and a second coefficient applied to the second length is constant and matches the total number of OFDM symbols within the time interval, and the second length is determined based on an adjustment of the first coefficient representing a number of OFDM symbols to which the first CP is applied.

12. The apparatus of claim 11, wherein
the CP is a first CP having a first length or a second CP having a second length, and satisfies equation below, $$\frac{1}{F_s}(N_s + aCP_1 + (N_s - a)CP_2) = 0.5 \text{ (ms)} \quad \text{[Equation]}$$

wherein $F_S$ is the subcarrier spacing, $CP_1$ is the first length, $CP_2$ is the second length, $N_S$ is a number of OFDM symbols included in a time interval of 0.5 ms based on the subcarrier spacing, and a is a number of OFDM symbols to which the first CP is applied, among the N number of OFDM symbols.

* * * * *